C. P. STEINMETZ.
ALTERNATING CURRENT MOTOR.
APPLICATION FILED SEPT. 1, 1915.

1,239,979.

Patented Sept. 11, 1917.

Inventor:
Charles P. Steinmetz
by  
His Attorney.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT MOTOR.

1,239,979.            Specification of Letters Patent.     Patented Sept. 11, 1917.

Application filed September 1, 1915. Serial No. 48,470.

*To all whom it may concern:*

Be it known that I, CHARLES P. STEINMETZ, a citizen of the United States, residing at Schenectady, county of Schenectady, State of New York, have invented certain new and useful Improvements in Alternating-Current Motors, of which the following is a specification.

My invention relates to single phase alternating current motors, and in particular to condenser induction motors adapted to be operated from a single phase source of alternating current energy. The object of my invention is to provide an improved single phase alternating current motor having considerable starting torque together with good efficiency under normal load conditions. More particularly, the object of my invention is to provide an improved condenser induction motor having considerable starting torque when supplied with single phase alternating current energy. Another object of my invention is to generally improve the single phase condenser induction motor, and particularly to provide a novel and improved arrangement and construction of the windings of such a motor.

Figure 1:
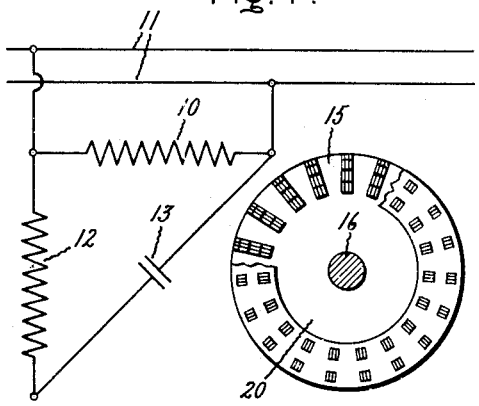
Figure 2:
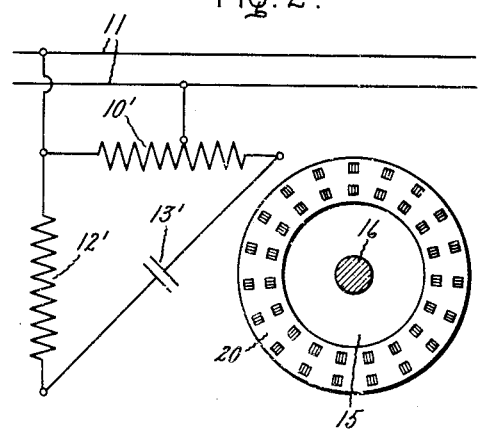
Figure 3:
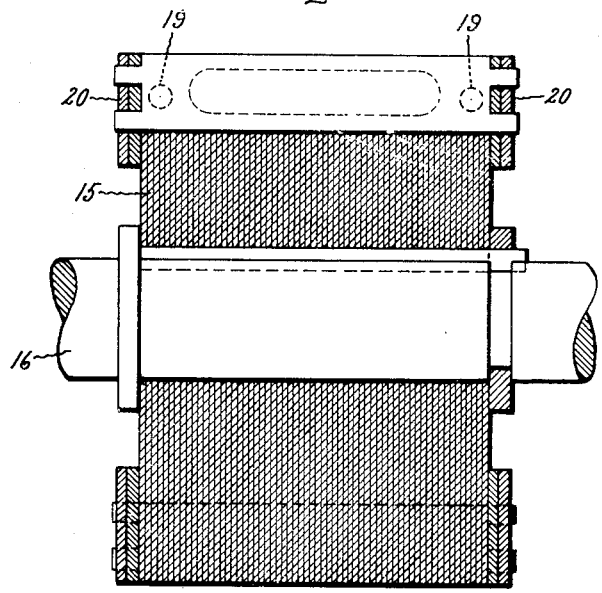
Figure 4:
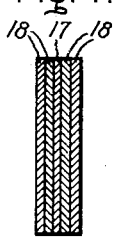

The novel features which I believe to be patentably characteristic of my invention are definitely indicated in the claims appended hereto. The principle of operation of my invention and its practical application to a single phase condenser induction motor will be understood from the following description taken in connection with the accompanying drawings, in which Figures 1 and 2 are diagrammatic views illustrating two embodiments of my present invention in condenser induction motors; and Figs. 3 and 4 are detail views of the secondary winding represented in Figs. 1 and 2.

As is well known, a plain single phase induction motor will not start when connected to a single phase source of alternating current energy. The use of phase-splitting devices for supplying polyphase alternating currents to the primary winding of such a motor is also well known. In the condenser induction motor, the phase-splitting device takes the form of a suitable phase-advancing means, such as a condenser. The phase-advancing means is included in a circuit of the primary winding which is inductively or conductively connected to the alternating current source of supply. Phase-advancing means so connected not only provide the necessary polyphase currents for starting the motor, but also provide means for improving the power factor of the motor, as explained in my U. S. Letters Patent Nos. 602,920 and 602,921, patented April 26, 1898.

I have found that a short-circuited winding of low impedance, such as an ordinary low resistance squirrel cage winding, cannot be used as the secondary winding of such a motor, if the motor is to have any starting torque whatever. A low resistance secondary winding appears to act in a single phase induction motor very much like a short-circuited secondary winding of a transformer, in as much as it blows out the motor flux. This blowing out of the motor flux so diminishes the voltage at the terminals of the primary winding that practically no flux is produced by any of the circuits of the primary winding, and consequently the motor has no shifting magnet field and its rotor will not start.

I have discovered that if a condenser induction motor is provided with a suitable secondary winding of inductively changing effective resistance, it will not only start when connected to a single phase source of alternating current energy, but will in fact have a considerable and for most purposes an entirely satisfactory starting torque, and will, furthermore, operate at full speed with satisfactory efficiency. By a secondary winding of inductively changing effective resistance, I mean a winding whose effective resistance is inductively changed, so that at relatively high frequencies of the secondary current, when the inductive effect of the windings is high, its effective resistance is also relatively high, while at relatively low frequencies, when the inductive effect is slight, the effective resistance of the winding is relatively low. Such a winding, accordingly, possesses considerable impedance at standstill and low speeds of the motor, but has relatively little impedance at speeds in the neighborhood of synchronism.

My invention will be best understood by reference to the accompanying drawings. In Fig. 1 thereof, I have represented the main primary winding 10 of a condenser induction motor connected directly across the mains 11 of a single phase alternating current circuit. A second or auxiliary primary winding 12 is arranged on the stator member of the motor and is displaced at an angle of 90 electrical degrees in space from the winding 10. The two windings 10 and 12 are arranged on the stator member just as the two primary windings of a quarter-phase motor. A condenser 13 is connected in series with the auxiliary primary winding 12, and the condenser and winding 12 are then connected across the mains 11, or across the terminals of the motor. The circuits of the two primary windings 10 and 12 are thus connected in parallel across the mains 11.

The presence of the condenser in the circuit of the auxiliary primary winding 12 produces a leading current in this circuit which sets up a flux out of time phase with the flux set up by the current in the main primary winding 10. The two fluxes thus set up by the currents flowing in the two primary windings are displaced in space and time phase and produce a shifting magnetic field of well known characteristics. The lead of the current flowing in the circuit of the auxiliary primary winding can be so proportioned by the suitable design of the condenser as to correctly compensate for the lag of the current flowing in the main primary winding, whereby the motor operates with approximately unity power factor.

The secondary winding is carried by the rotor member of the motor and is a short-circuited winding of inductively changing effective resistance. In the drawings, I have illustrated the secondary winding as a squirrel cage winding having relatively deep conductor bars positioned in correspondingly deep slots of the rotor member. Suppose for the moment that the secondary winding is of low impedance, that is low resistance and low inductance. At standstill, such a secondary winding acts with respect to the primary windings like a short-circuited secondary winding of a transformer and tends to blow out or kill the flux set up by the currents flowing in the primary windings, so that substantially no shifting magnetic field is developed, and hence the rotor will not start. For this reason, I have found it necessary that the secondary winding should have considerable impedance, if the rotor is to start from a single phase circuit. After the rotor has speeded up, low impedance of the secondary winding has no objectionable effect upon the motor flux, since the electromotive forces induced in the conductors of the secondary winding by rotation keep down the secondary current. In fact, for efficient running of the motor, the secondary winding should be of low impedance, and hence the ideal secondary winding for the condenser induction motor is one having high impedance at starting and low impedance at running speeds. This result can be attained if the secondary winding has considerable inductance, since the inductive effect will be more pronounced at starting, when the secondary current is of high frequency, than at running speeds, when the secondary current is of low frequency.

The rotor core 15 is mounted upon a shaft 16 and is provided with slots for the secondary winding. The slots are relatively deep so that the conductor bars positioned therein have considerable inductance. If the conductor bars of the secondary winding have considerable inductance, the effective resistance of the winding will be considerably greater at or near standstill, when the frequency of the secondary current is high, than at running speeds of the motor, when the frequency of the secondary current is low. A secondary winding having relatively deep conductor bars positioned in relatively deep slots in the magnetic core of the secondary member thus has an inductively changing effective resistance, or, in other words, an effective resistance varying with the frequency of the secondary current due to the action of its inductance.

The increased losses in the deep bar secondary winding construction at relatively high frequencies of the secondary current are occasioned principally by eddy currents. The alternating magnetic field to which the conductor bars are subjected sets up eddy currents which flow around the conductor bars in closed paths, indicated generally by the dotted line in Fig. 3 of the drawings. The magnitude of the eddy currents depends upon the number of lines of magnetic force surrounding or cutting the conductor bar and upon the frequency of the secondary current. Increasing the depth of the slot and conductor bar increases the number of lines of magnetic force influencing the bar. Diminishing the width of the slot, or more accurately the width of the gap in the magnetic circuit occupied by the conductor bar, reduces the reluctance of the path for the lines of magnetic force, thus increasing the number of such lines. The eddy currents, for any particular frequency of the secondary current, may thus be increased by increasing the slot depth and decreasing the width of the non-magnetic gap occupied by the conductor bar. The flow of eddy currents in the conductor bar causes $I^2R$ losses, and, since the magnitude of the eddy currents depends upon the frequency of the secondary current, these losses will be greatest at or near standstill, when the frequency of the secondary current is relatively high, and will diminish as the motor speeds up and the frequency of the secondary current decreases. Since the losses in the secondary winding of the motor are determined by the effective resistance of the secondary winding, it may equally well be said that the effective resistance of a secondary winding of relatively high inductance varies as the frequency of the secondary current, or, as commonly expressed, the secondary winding has an inductively changing effective resistance.

The depth of the conductor bars in an ordinary squirrel cage winding for an induction motor of about 15 horsepower is in the neighborhood of $\frac{1}{2}$ of an inch. In speaking of relatively deep slots and correspondingly deep conductor bars, I mean relatively deep with respect to the slots and conductor bars ordinarily employed in a short-circuited secondary winding of an induction motor. As a specific example of the depth of slot which has been found satisfactory in a condenser induction motor of about 15 horsepower, I mention, merely by way of example, 2 inches, but it will of course be understood that in all cases that slot depth is selected for most satisfactorily securing the advantages of increased eddy current losses due to deep slot construction.

Experiments have demonstrated that the increase in the effective resistance due to deep bar construction is very advantageously accentuated when the conductor bar is relatively thin. This of course particularly applies in the case of small and medium sized motors. For example, it has been found that the conductor bar should be not over $\frac{1}{16}$ of an inch thick in motors up to 15 horsepower, and generally should be less than $\frac{1}{16}$ of an inch, while in smaller motors the conductor bar should be of considerably less thickness. The reduced thickness of the conductor bar obviously increases the ohmic resistance of the path for the flow of eddy currents. Since it is impractical to punch a slot only $\frac{1}{16}$ of an inch wide, the construction shown in detail in Figs. 3 and 4 has been devised. The slots in the laminations making up the core 15 are punched with a width considerably greater than the thickness of the secondary conductor bars. For example, the slots may be punched about $\frac{1}{8}$ of an inch in width. Each slot carries a composite conductor bar comprising a sheet metal strip 17 of high specific conductivity. This sheet metal strip is of substantially the slot depth, but of considerably less thickness than the slot width. Sheet copper is very well adapted as the material from which the strip may be stamped or otherwise formed. Sheet metal strips 18 are positioned on each side of the strip 17, and the strips so assembled are securely bound together by spot welding as at 19. The sheet metal strips 18 are of a material of low specific conductivity, and preferably are of magnetic material, such as sheet iron. The strip 17 is positioned approximately in the center of the slot, and one of the functions of the strips 18 is to fill up the slot. The use of magnetic material for the strips 18, furthermore, reduces the reluctance of the magnetic path across the slot, since the only non-magnetic gap in this path is the space occupied by the thin conductor 17. The composite conductor bars are positioned in the slots of the core 15 and welded or soldered to end rings 20. The specific construction of the rotor herein illustrated for the purpose of explaining my invention forms no part of such invention, but is the subject matter of a separate application filed in behalf of Sven R. Bergman, Serial No. 31,835, filed June 3, 1915.

The deep bar rotor construction illustrated in the accompanying drawings is particularly advantageous in the condenser induction motor, since, by properly proportioning the copper and iron of the composite conductor bar, the deep bar effect can be controlled within a very wide range, that is to say the winding may give a higher or lower effective resistance at standstill, thereby obtaining the desired starting and acceleration curves. Due to the thinness of the copper strips 17 the path for the flow of eddy currents is of relatively high resistance, so that the $I^2R$ loss when the eddy currents are large, that is when the rotor is at or near standstill, is relatively high. The deep bar construction accomplishes two important ends in the condenser induction motor, first, by preventing a blowing out of the motor flux, it insures the development of a shifting magnetic field and hence the starting of the motor, and, second, by the increased impedance of the secondary winding at standstill, it insures a satisfactory starting torque of the motor.

In order to get the theoretical maximum effect of the condenser, the angle of the condenser winding should be such that the component of the condenser current in quadrature direction in space, which gives the quadrature flux, is a maximum, when the condenser current is induced by the main winding. This means, $$\cos w - \sin w = \max., \text{ or } w = 45°.$$

This equation applies for the case when the rotor resistance is so high as to neglect the reaction of the induced rotor current. Taking the latter in view, there is a drop which lowers the effect, and this may be taken care of by raising the inducing voltage, that is, by lengthening the main primary winding, as represented in Fig. 2 of the drawings. Reference to Fig. 2 will show that the main primary winding 10' has been so lengthened that the voltage between its terminals is substantially greater than the voltage of the mains 11. This will be fully understood by observing that the winding 10' acts as an autotransformer. Lengthening of the primary winding 10' has a further advantage in that it enables the use of a higher voltage, and hence cheaper, condenser construction. If we assume that the ratio of transformation of the winding 10' is 1:2, then the voltage across the entire main primary winding 10' will be 440 volts, and the voltage impressed on the condenser 13' will, therefore, be 440 √2 or approximately 620 volts.

In my prior patents it will be observed that in the self-starting single phase motor the tertiary winding is located at an angle other than zero or 90 degrees from the primary winding, so that the tertiary winding is in inductive relation both to the primary and secondary windings. With this arrangement the tertiary winding acts as a transformer secondary winding, and has a voltage induced therein. In accordance with my present invention, the auxiliary primary winding has a voltage impressed thereon, and the magnitude of this voltage is always sufficient when the motor is at or near standstill to produce a satisfactory flux as a result of the current flowing in the auxiliary primary winding. The relatively high effective resistance of the secondary winding at or near standstill of the motor contributes to this end, in that it prevents the blowing out of the motor flux, and thus an abnormal lowering of the voltage at the motor terminals. In accordance with the arrangement of my present invention, the two primary windings need not, therefore, be displaced in space by an angle other than zero or 90 degrees, but are in fact displaced by an angle of 90 degrees, as heretofore explained and as illustrated in Figs. 1 and 2 of the drawings. The 90 degree space relation between the two primary windings will be recognized by those skilled in the art as the most desirable arrangement of the windings.

What I claim as new and desire to secure by Letters Patent of the United States, is:

1. An alternating current motor comprising two primary windings displaced in space relation and electrically connected to each other so that one of said windings is adapted to act as an autotransformer for impressing a voltage on the second winding, phase advancing means associated with said second winding, and a secondary winding having relatively high impedance when the rotor of the motor is at or near standstill but relatively low impedance at running speeds of the motor.

2. An alternating current motor comprising two primary windings displaced in space by 90 electrical degrees, electrical connections between said windings whereby one of said windings is adapted for direct connection to a single phase source of alternating current energy and to act as an autotransformer for impressing on the second winding a voltage higher than the voltage of said source, phase advancing means electrically associated with said second winding, and a secondary winding of inductively changing effective resistance inductively related to said primary windings.

3. An alternating current motor comprising two primary windings displaced in space by 90 electrical degrees, electrical connections between said windings whereby one of said windings is adapted for direct connection to a single phase source of alternating current energy and to act as an autotransformer for impressing on the second winding a voltage higher than the voltage of said source, phase advancing means electrically associated with said second winding, and a secondary winding inductively related to said primary windings.

4. An alternating current motor comprising two primary windings displaced in space by 90 electrical degrees, electrical connections between said windings whereby one of said windings is adapted for direct connection to a single phase source of alternating current energy and to act as an autotransformer for impressing on the second winding a voltage higher than the voltage of said source, phase advancing means electrically associated with said second winding, and a secondary winding having relatively high impedance when the rotor of the motor is at or near standstill but relatively low impedance at running speeds of the motor.

5. An alternating current motor comprising two primary windings displaced in space by 90 electrical degrees, a single phase source of alternating current energy electrically connected to both windings, phase advancing means electrically associated with one of said windings, and a secondary winding having relatively high inductive reactance when the rotor of the motor is at or near standstill but having relatively low inductive reactance at running speeds of the motor.

6. An alternating current motor comprising two primary windings displaced in space by 90 electrical degrees, a single phase source of alternating current energy electrically connected to both windings, phase advancing means electrically associated with one of said windings, and a short-circuited secondary winding having conductor bars positioned in relatively deep slots whereby the winding has considerable inductance.

7. An alternating current motor comprising a main primary winding, an auxiliary primary winding displaced in space relation from said main primary winding and electrically connected thereto, phase advancing means electrically associated with said auxiliary primary winding, and a short-circuited secondary winding of inductively changing effective resistance.

8. An alternating current motor comprising two primary windings displaced in space by 90 electrical degrees, a single phase source of alternating current energy electrically connected to both windings, phase advancing means electrically associated with one of said windings, and a short-circuited secondary winding of inductively changing effective resistance.

9. An alternating current motor comprising two primary windings displaced in space by 90 electrical degrees, electrical connections between said windings whereby one of said windings is adapted for direct connection to a single phase source of alternating current energy and to act as an autotransformer for impressing on the second winding a voltage higher than the voltage of said source, a condenser connected in series relation with said second winding, and a short-circuited secondary winding of inductively changing effective resistance.

In witness whereof, I have hereunto set my hand this 30th day of August, 1915.

CHARLES P. STEINMETZ.